United States Patent
Chen (10) Patent No.: US 9,302,330 B2
(45) Date of Patent: Apr. 5, 2016

(54) ADJUSTABLE HEATING MANTLE FOR A TOOL HOLDER

(71) Applicant: Ching-Ting Chen, Taichung (TW)

(72) Inventor: Ching-Ting Chen, Taichung (TW)

( * ) Notice: Subject to any disclaimer, the term of this patent is extended or adjusted under 35 U.S.C. 154(b) by 309 days.

(21) Appl. No.: 14/094,982

(22) Filed: Dec. 3, 2013

(65) Prior Publication Data

US 2015/0151366 A1 Jun. 4, 2015

(51) Int. Cl.
*B23B 31/117* (2006.01)
*H05B 6/14* (2006.01)
*B23B 31/39* (2006.01)

(52) U.S. Cl.
CPC ............ *B23B 31/39* (2013.01); *B23B 31/1179* (2013.01); *B23B 2231/34* (2013.01); *H05B 6/14* (2013.01); *H05B 6/145* (2013.01); *Y10T 29/49865* (2015.01); *Y10T 279/17008* (2015.01); *Y10T 279/17957* (2015.01)

(58) Field of Classification Search
CPC .................. B23B 31/1179; Y10T 279/17008; Y10T 29/49865; Y10T 279/17957
See application file for complete search history.

(56) References Cited

U.S. PATENT DOCUMENTS

| | | | | |
|---|---|---|---|---|
| 17,814 | A * | 7/1857 | Whiton ................. | B23B 47/281 126/104 R |
| 469,035 | A * | 2/1892 | Avery ................... | B23B 31/005 279/14 |
| 504,047 | A * | 8/1893 | McAlpine ............... | B23B 29/20 279/14 |
| 1,318,057 | A * | 10/1919 | Dean ....................... | B25B 5/101 269/221 |
| 6,060,694 | A * | 5/2000 | Hauser ................. | B23P 11/027 219/221 |
| 6,712,367 | B1 * | 3/2004 | Irion ...................... | B23B 31/02 279/102 |
| 6,822,206 | B2 * | 11/2004 | Haimer ................. | B23P 11/027 219/635 |
| 6,861,625 | B1 * | 3/2005 | Haimer ............... | B23B 31/1179 219/221 |
| 6,900,418 | B2 * | 5/2005 | Haimer .................... | H05B 6/14 219/607 |
| 8,963,059 | B2 * | 2/2015 | Haimer ................. | B23P 11/027 219/635 |
| 2001/0054471 | A1 * | 12/2001 | Kelch .................. | B23B 31/1179 156/85 |
| 2003/0168445 | A1 * | 9/2003 | Haimer .................... | H05B 6/14 219/643 |
| 2006/0049180 | A1 * | 3/2006 | Haimer .............. | B23Q 17/0923 219/635 |
| 2008/0277386 | A1 * | 11/2008 | Haimer ................. | B23P 11/027 219/644 |
| 2010/0133262 | A1 * | 6/2010 | Haimer ................. | B23P 11/027 219/635 |

FOREIGN PATENT DOCUMENTS

| | | | | |
|---|---|---|---|---|
| DE | 10015074 | C1 * | 8/2001 | .......... B23B 31/1179 |
| DE | EP 1314511 | A2 * | 5/2003 | ............ B23P 11/027 |
| DE | 10255362 | B3 * | 3/2004 | ............ B23P 11/027 |
| DE | WO 2006103105 | A1 * | 10/2006 | ............ B23P 11/027 |
| DE | WO 2007042104 | A2 * | 4/2007 | .......... B23B 31/1179 |
| DE | 102006015880 | A1 * | 8/2007 | .............. B23B 31/02 |
| DE | EP 2036658 | A2 * | 3/2009 | ............ B23P 11/027 |
| DE | 10165086 | B4 * | 9/2013 | ............ B23B 31/117 |

* cited by examiner

*Primary Examiner* — Eric A Gates
*Assistant Examiner* — Paul M Janeski
(74) *Attorney, Agent, or Firm* — Rosenberg, Klein & Lee (57) ABSTRACT

An adjustable heating mantle for tool holder includes a mantle body, a positioning plate, an adjusting unit, a lid and a lever rod. The positioning plate is mounted on the top of the mantle body and has an assembling recess. The adjusting unit is mounted in the assembling recess and has two magnetic shielding boards, a sliding ring and two connecting rods. A lid covers a top face of the positioning plate and is mounted on the top of mantle body. A lever rod is inserted through the lid and mounted on one of the magnetic shielding boards. The two magnetic shielding boards are capable of being rotated synchronously by moving the lever rod for shielding magnetic force and fitting cutting tools of different diameters.

5 Claims, 9 Drawing Sheets

ADJUSTABLE HEATING MANTLE FOR A TOOL HOLDER

BACKGROUND OF THE INVENTION

1. Field of the Invention

The present invention relates to a tool holder and more particularly to an adjustable heating mantle for a tool holder.

2. Description of Related Art

A conventional heating mantle is used for heating a tool holder with an induction heating path. Because of thermal expansion, a diameter of the heated part of the tool holder becomes larger and can be assembled with a suitable cutting tool. After the tool holder is cooled down, the diameter of the heated part of the tool holder will shrink to fasten the cutting tool tightly.

The conventional heating mantle is a magnetic mantle having an insertion hole of a fixed diameter formed in a top of the mantle and is only applicable with a tool holder of a specific diameter. Therefore, the conventional heating mantle is not versatile in use.

To overcome the shortcomings of the conventional heating mantle, the present invention provides an adjustable heating mantle for a tool holder to mitigate or obviate the aforementioned problems.

SUMMARY OF THE INVENTION

The main objective of the invention is to provide an adjustable heating mantle for a tool holder; the adjustable heating mantle includes a mantle body, a positioning plate, an adjusting unit, a lid, and a lever rod.

The mantle body has a center and a top face, and a rod hole is formed through the center of the mantle body.

The positioning plate is mounted on the top face of the mantle body and has a top face, a wall, an assembling recess, a tool hole and multiple positioning protrusions. The wall is mounted in an outer periphery of the top face of the positioning plate. The assembling recess is formed in the top face of the positioning plate and inside the wall. The tool hole is formed through a center of the top face of the positioning plate and communicates with the rod hole. The positioning protrusions are disposed around the tool hole in the top face of the positioning plate.

The adjusting unit is mounted in the assembling recess and has two magnetic shielding boards, a sliding ring and two connecting rods. The magnetic shielding boards are rotatably mounted on two of the multiple positioning protrusions respectively and are arranged in a diagonal line, and each magnetic shielding board has a center and multiple tool notches formed around a periphery of the magnetic shielding board at intervals. The sliding ring is slidably mounted in the assembling recess. The connecting rods are both connected to the sliding ring and are respectively connected to the magnetic shielding boards.

The lid covers the top face of the positioning plate, is mounted on the top face of mantle body, and has a center, an outlet hole and a moving groove. The outlet hole is formed through the center of the lid and is coaxial with the tool hole. The moving groove is defined beside the outlet hole, and a shape of the moving groove corresponds to a rotation route of one of the ends of one of the connecting rods.

The lever rod is inserted through the moving groove and is mounted on one of the magnetic shielding boards.

The two magnetic shielding boards are moved synchronously by moving the lever rod.

Other objects, advantages, and novel features of the invention will become more apparent from the following detailed description when taken in conjunction with the accompanying drawing.

DETAILED DESCRIPTION OF PREFERRED EMBODIMENT

With reference to FIGS. 1 to 5, a preferred embodiment of an adjustable heating mantle in accordance with the present invention has a mantle body 10, a positioning plate 20, an adjusting unit 30, a rotating ring 40, a lid 50 and a lever rod 60.

Figure 1:
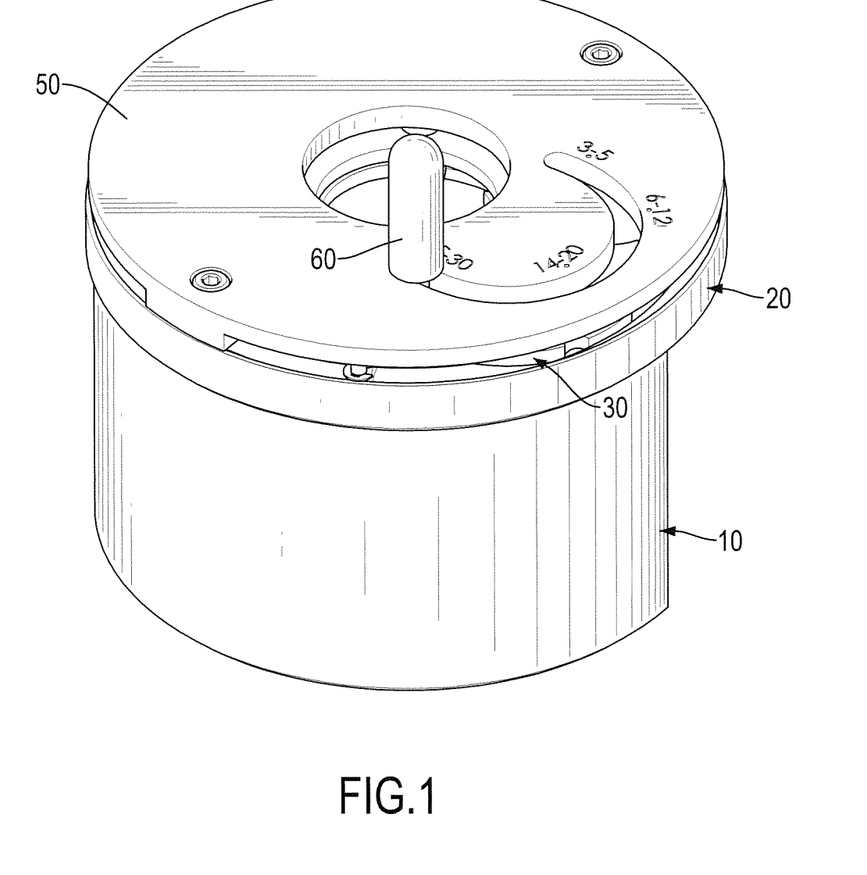
FIG. 1 is a perspective view of an adjustable heating mantle in accordance with the present invention.
Figure 2:
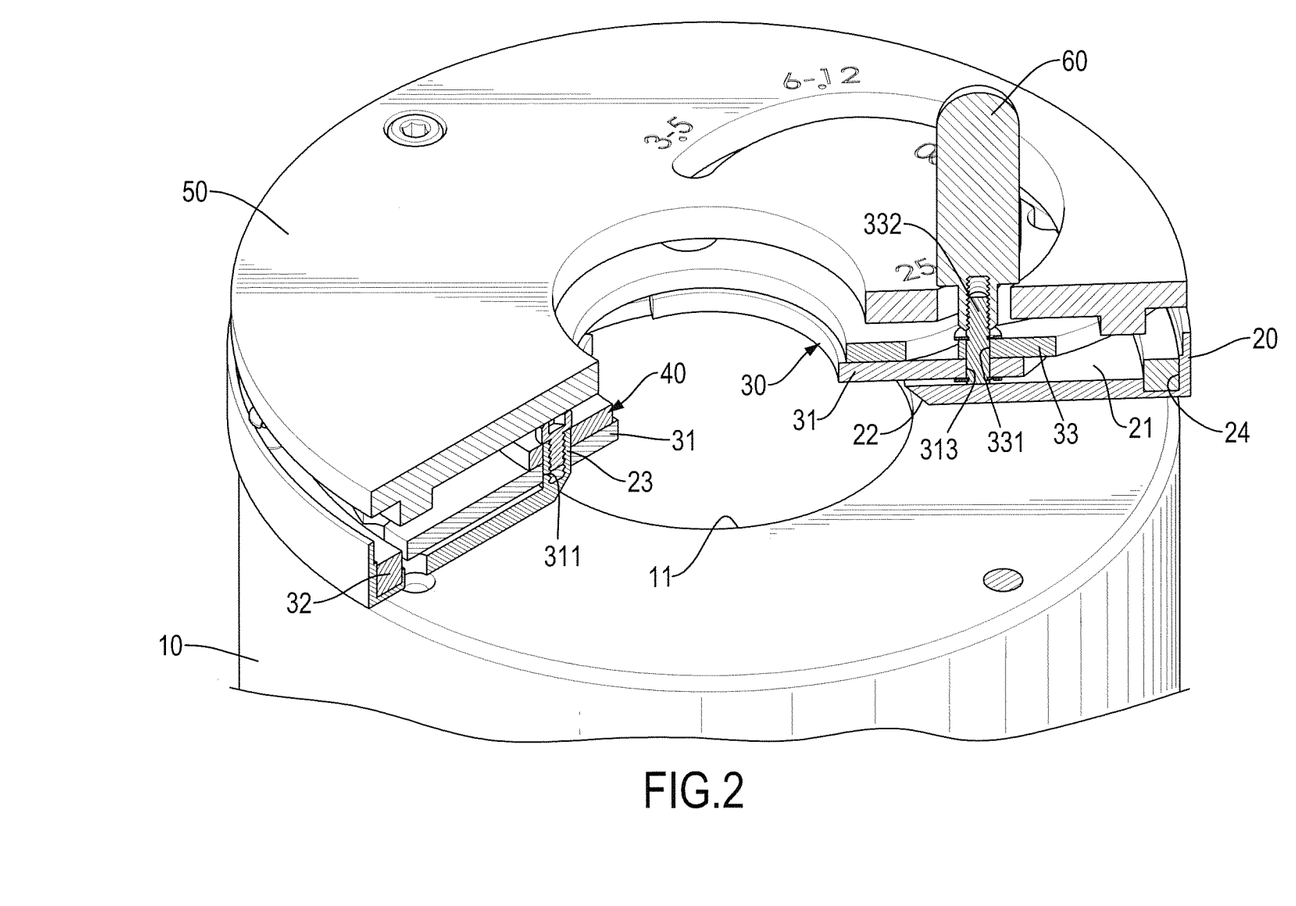
FIG. 2 is a perspective view in partial section of the adjustable heating mantle in FIG. 1.
Figure 7:
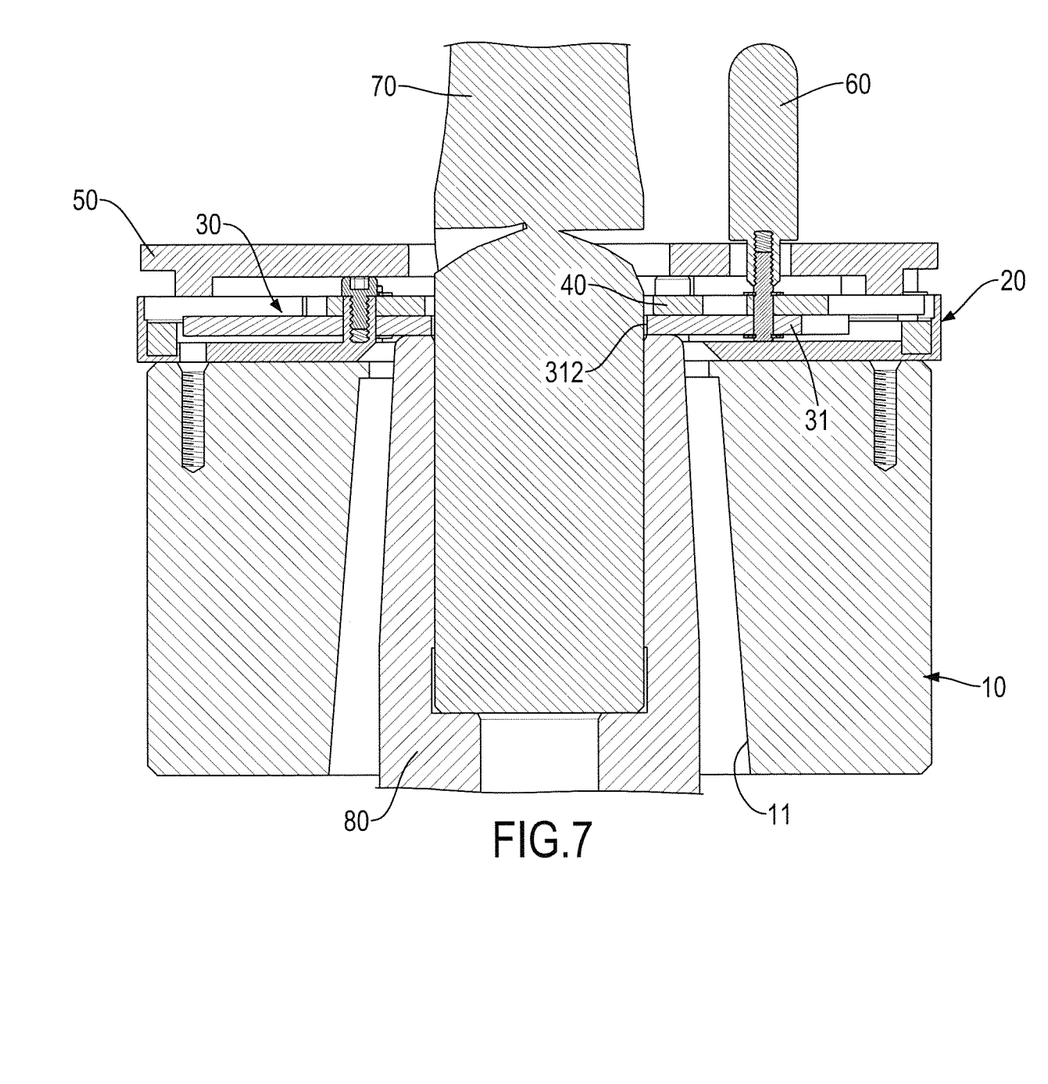
FIG. 7 is a side view in partial section of the adjustable heating mantle combined with the cutting tool in FIG. 6.

With reference to FIGS. 1, 2 and 7, the mantle body 10 is cylindrical and has a rod hole 11 and a center. The rod hole 11 is conical and formed through the center of the mantle body 10.

Figure 3:
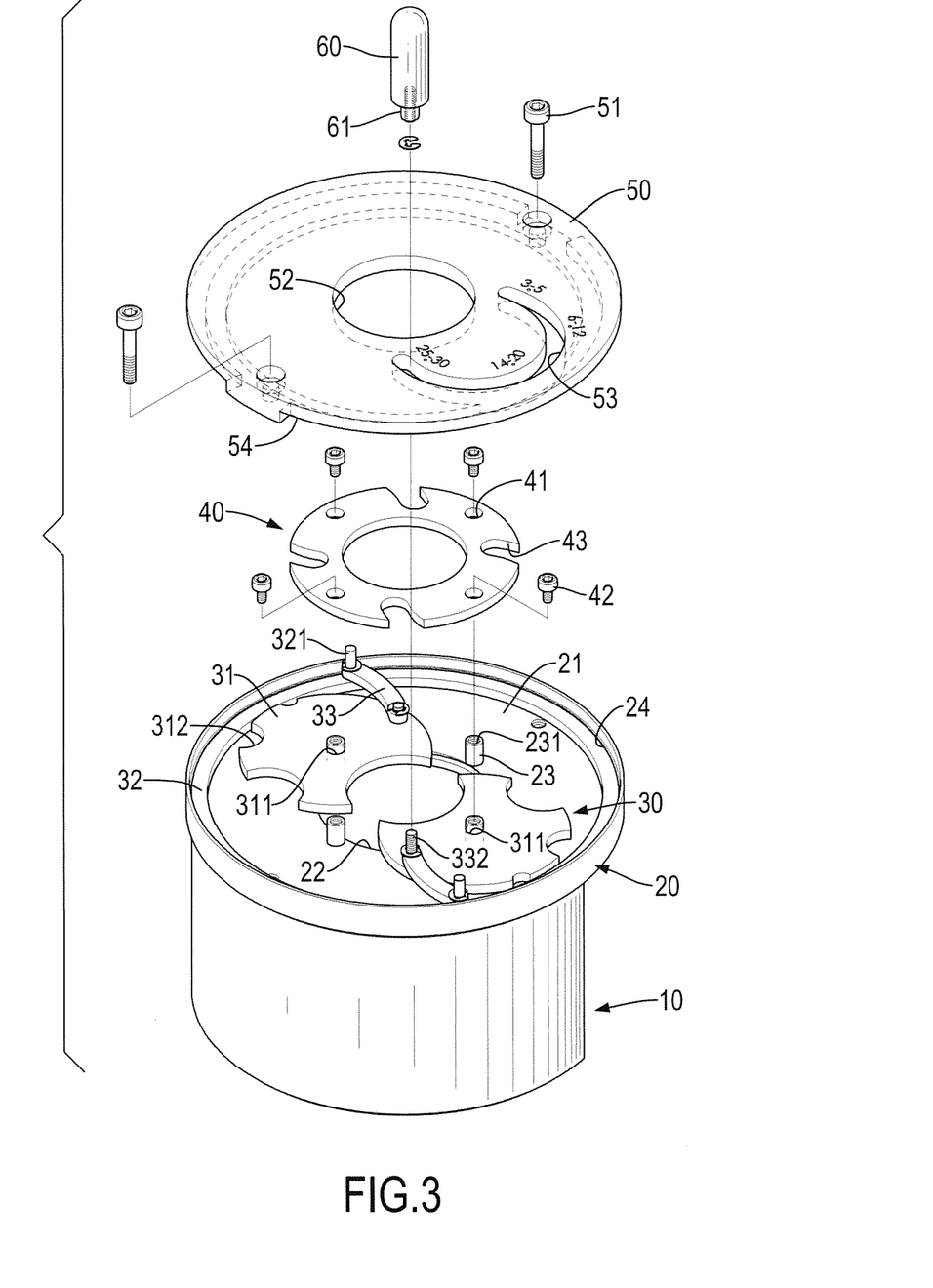
FIG. 3 is an exploded perspective view of the adjustable heating mantle in FIG. 1.

With reference to FIGS. 2 and 3, the positioning plate 20 is mounted on a top face of the mantle body 10. The positioning plate 20 has a top face, a wall, an assembling recess 21, a tool hole 22, four positioning protrusions 23 and a sliding groove 24. The wall is mounted on an outer periphery of the top face of the positioning plate 20. The assembling recess 21 is formed in the top face and around the wall. The tool hole 22 is formed through the center of the positioning plate 20 and communicates with the rod hole 11. The positioning protrusions 23 are disposed around the tool hole 22 at equal intervals on the top face of the positioning plate 20. A fixing hole 231 is formed through each positioning portion 23. The sliding groove 24 is formed in the bottom of the assembling recess 21 and is adjacent to the wall of the positioning plate 20. The sliding groove 24 extends along the wall of the positioning plate 20.

With reference to FIGS. 2 and 3, the adjusting unit 30 is mounted in the assembling recess 21 and includes two magnetic shielding boards 31, a sliding ring 32 and two connecting rods 33. The magnetic shielding boards 31 are made by powder metallurgy. The two magnetic shielding boards 31 are rotatably and respectively mounted around two of the positioning protrusions 23 that are arranged in a diagonal line. Each magnetic shielding board 31 has a top surface, a center, a positioning hole 311, multiple tool notches 312 and a lever hole 313. The positioning hole 311 is formed in the center of the magnetic shielding board 31 and is disposed around one of the positioning protrusions 23. The tool notches 312 are semi-circular and arranged around the periphery of the magnetic shielding boards 31 at intervals. The radiuses of the tool notches 312 gradually decrease along a clockwise direction. The lever hole 313 is formed in the top face of the magnetic shielding board 31.

The sliding ring 32 is slidably mounted in the sliding groove 24 of the positioning plate 20 and has two positioning rods 321. The positioning rods 321 are mounted on and protrude from a top surface of the sliding ring 32 respectively at two ends of a diameter of the sliding ring 32.

The two connecting rods 33 are both connected to the sliding ring 32 and are respectively connected to the magnetic shielding boards 31. Each connecting rod 33 has a first end, a second end, two connecting holes 331 and a fixing pin 332. The first end and the second end are opposite to each other. The connecting holes 331 are respectively formed in the first end and the second end. The connecting hole 331 at the first end is aligned with one of the lever holes 313, and the connecting hole 331 at the second end fits correspondingly around one of the positioning rods 321. The fixing pin 332 is inserted into one of the lever holes 313 and is mounted in the connecting hole 331 at the first end.

With reference to FIGS. 2 and 3, the rotating ring 40 is annular, is engaged with the positioning protrusions 23 and covers the two magnetic shielding boards 31. The rotating ring 40 has multiple through holes 41, multiple screws 42 and multiple escaping notches 43. The through holes 41 are formed in and along a periphery of the rotating ring 40 at intervals, and are disposed correspondingly to the positioning protrusions 23 respectively. Each through hole 41 respectively fits around each positioning portion 23. The screws 42 are mounted through the rotating ring 40 and are respectively screwed into the fixing holes 231. The escaping notches 43 are formed in the periphery of the rotating ring 40, and each escaping notch 43 is disposed between two of the through holes 41.

With reference to FIGS. 2 and 3, the lid 50 covers the top face of the positioning plate 20 and is mounted on the top face of the mantle body 10 by two screws 51. The lid 50 has a center, an outer periphery, an outlet hole 52, a moving groove 53 and two sliding gaps 54. The outlet hole 52 is formed through the center of the lid 50, and is coaxial with the tool hole 22. The moving groove 53 is U-shaped and defined beside the outlet hole 52. The shape of the moving groove 53 corresponds to a rotation route of one of the two ends of one of the connecting rods 33. The two sliding gaps 54 are formed in the bottom side of the lid 50 and are respectively located above the two positioning rods 321.

With reference to FIGS. 2 and 3, the lever rod 60 is mounted through and abuts the lid 50. The lever rod 60 has a bottom and a positioning end 61 at the bottom. The positioning end 61 is inserted through the moving groove 53 and is connected to one of the fixing pins 332.

Figure 4:
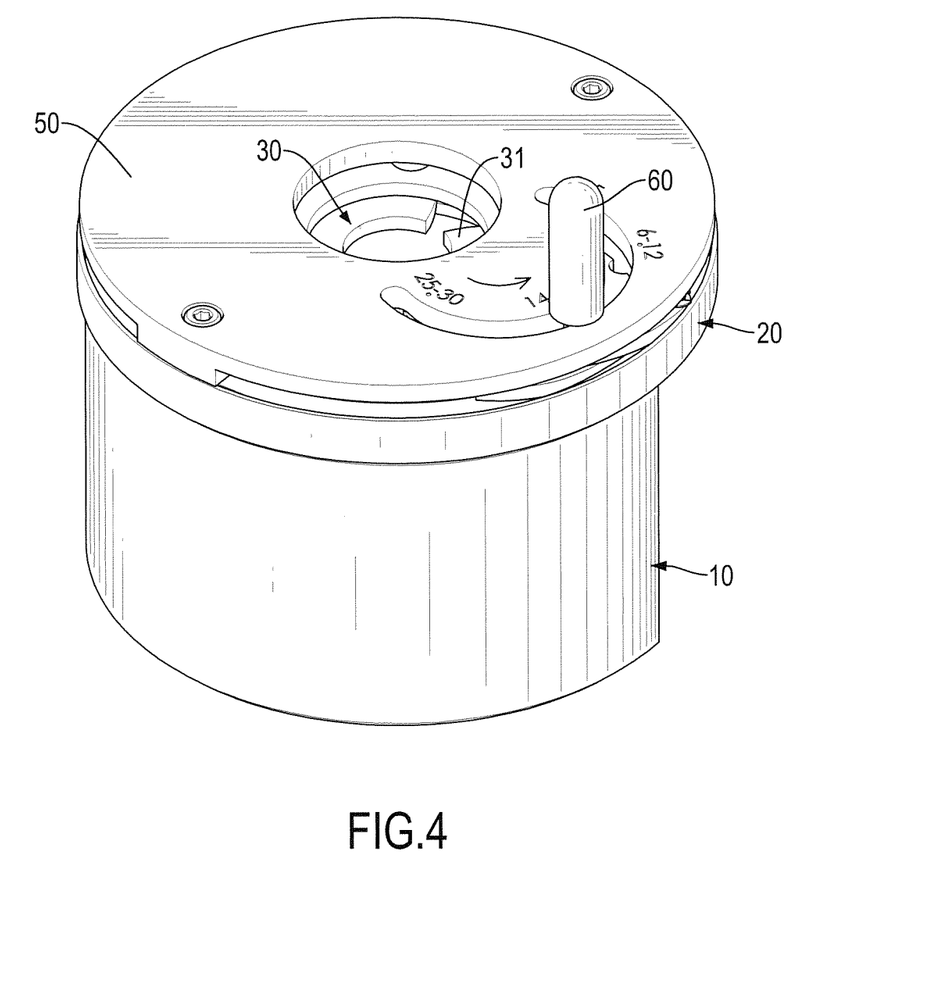
FIG. 4 is an operational perspective view of the adjustable heating mantle in FIG. 1.
Figure 5:
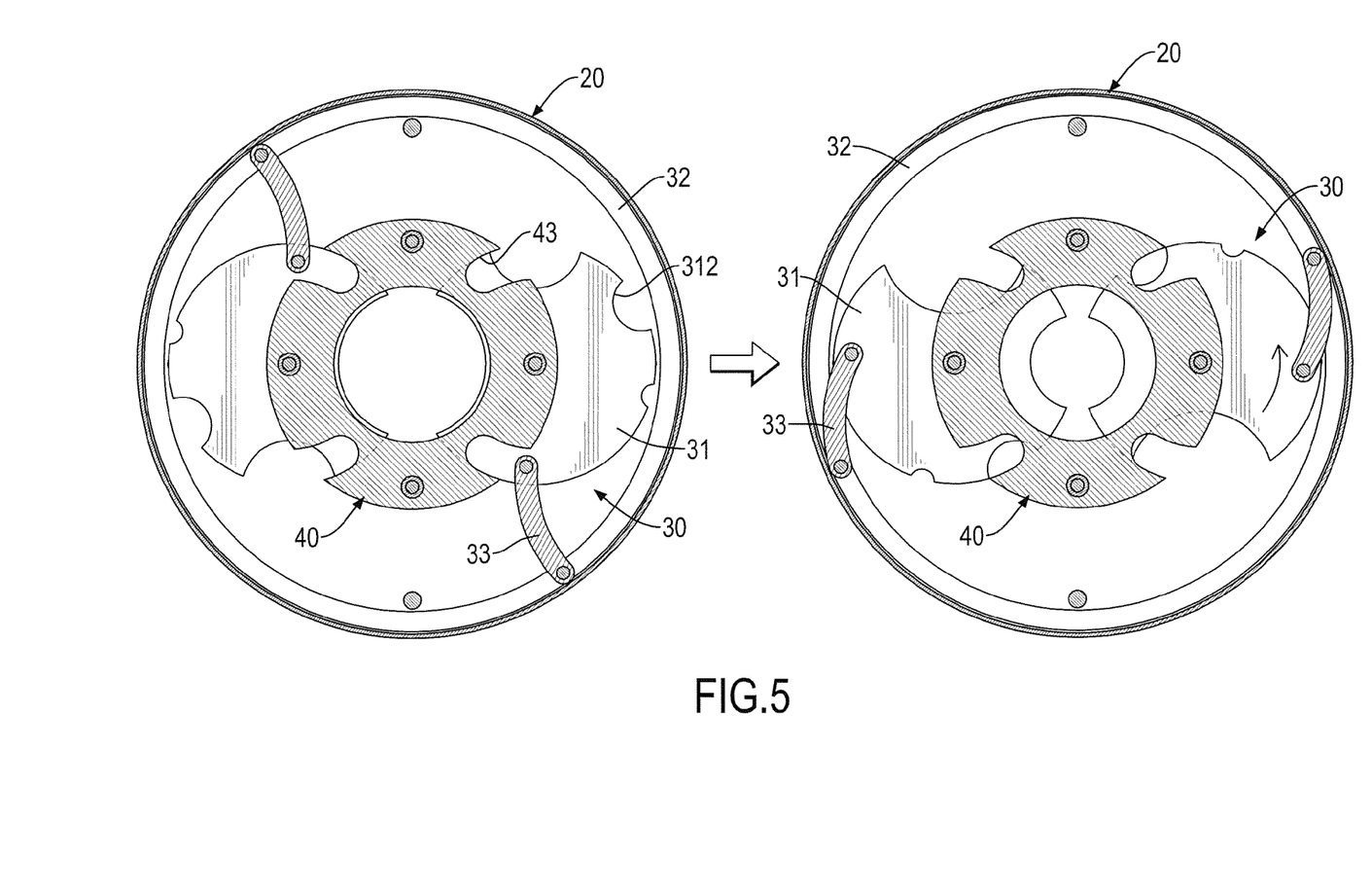
FIG. 5 shows operational cross sectional top views of the adjustable heating mantle in FIG. 4.

With reference to FIGS. 1, 4 and 5, when the lever rod 60 is moved along the moving groove 53, a corresponding one of the magnetic shielding boards 31 is rotated at the same time. One of the connecting rods 33 mounted on the rotated magnetic shielding board 31 is pivotally swung to rotate the sliding ring 32. During rotation of the sliding ring 32, the other connecting rod 33 is swung to rotate synchronously. Moving the lever rod 60 makes the two magnetic shielding boards 31 rotate correspondingly, such that two of the multiple tool notches 312 of the two magnetic shielding boards 31 are aligned with each other. With reference to FIGS. 4 and 5, the two magnetic shielding boards 31 are capable of surrounding a cutting tool by the two aligned tool notches 312.

Figure 6:
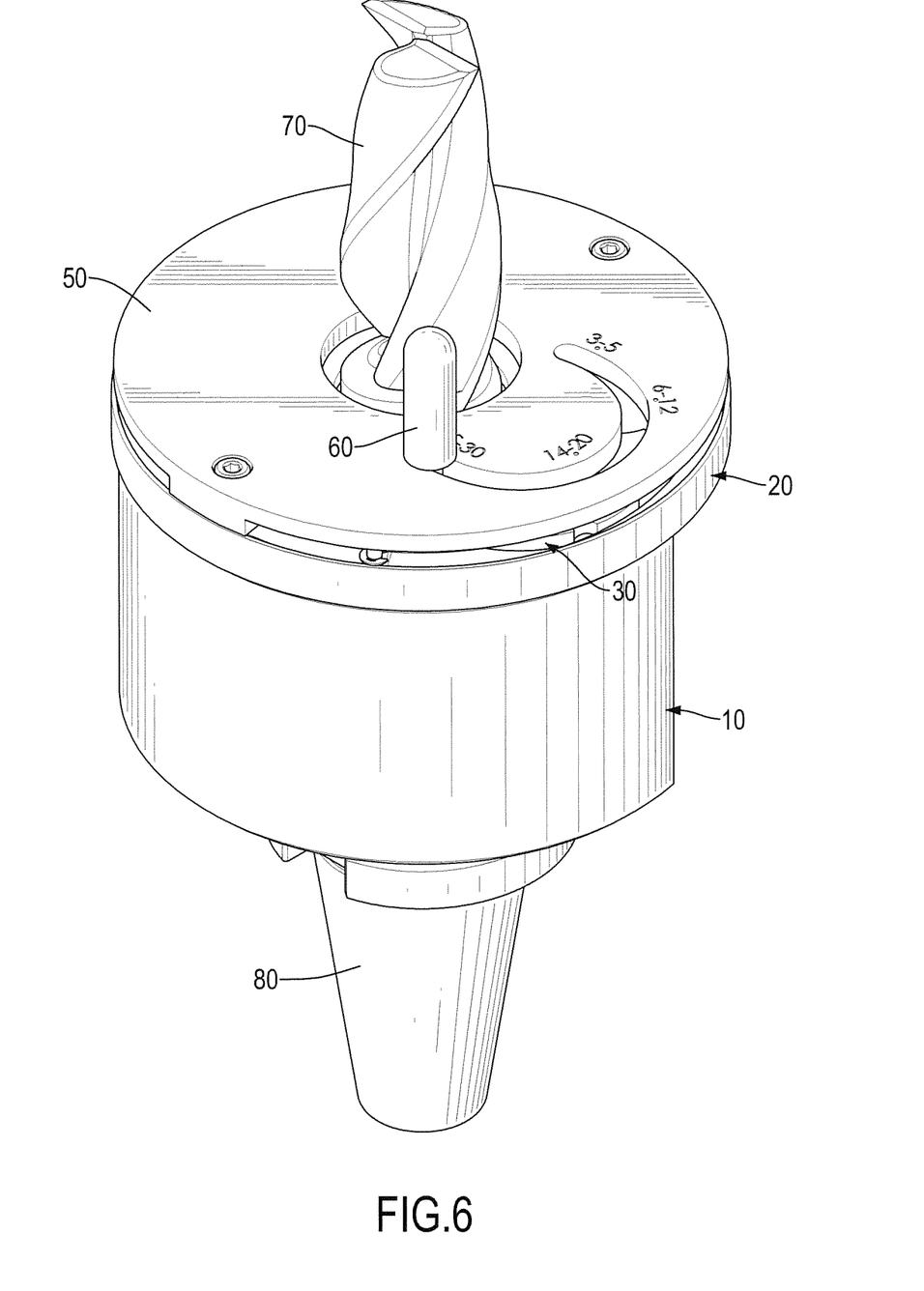
FIG. 6 is a perspective view of the adjustable heating mantle in FIG. 1 combined with a cutting tool.

With reference to FIGS. 6 and 7, a cutting tool 70 combined with a tool holder 80 is inserted into the rod hole 11 for induction heating. The cutting tool 70 has a relative large diameter and protrudes from the tool hole 22. The mantle body 10 will generate a magnetic induction field to heat the tool holder 80. In order to shield the magnetic force from the mantle body 10 and to concentrate the induction heat to be stored inside the mantle body 10, the two magnetic shielding boards 31 block a gap between the tool hole 22 and the cutting tool 70 for shielding the magnetic force. Therefore, the lever rod 60 is moved to rotate the two magnetic shielding boards 31 to a suitable location until the tool notches 312 having corresponding radius face each other to surround the cutting tool 70. When the diameter of the tool holder 80 expands by heating, the cutting tool 70 can be detached from the tool holder 80.

Figure 8:
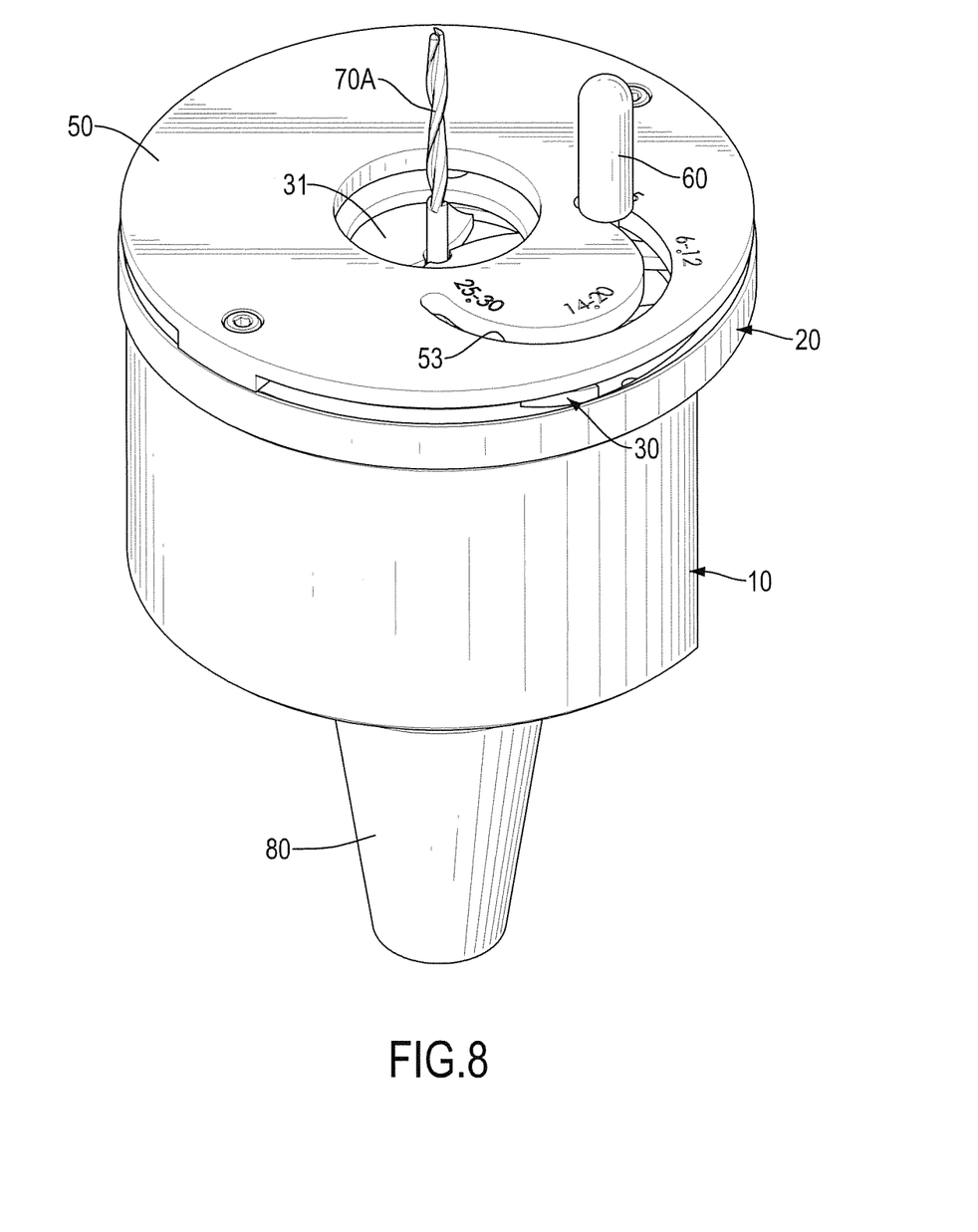
FIG. 8 is a perspective view of the adjustable heating mantle in FIG. 1 combined with another cutting tool.
Figure 9:
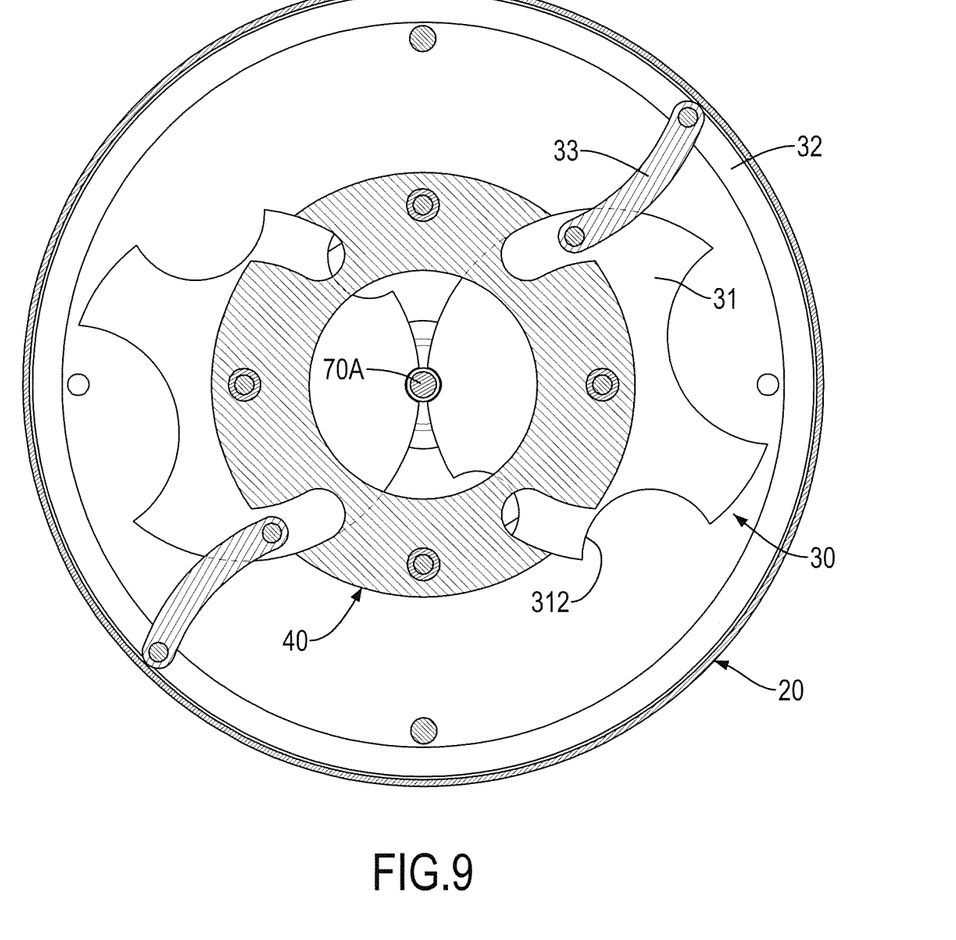
FIG. 9 is a cross sectional top view of the adjustable heating mantle combined with said another cutting tool in FIG. 8.

With reference to FIGS. 8 and 9, to combine a cutting tool 70A having a relatively small diameter with the tool holder 80, the two magnetic shielding boards 31 are rotated by moving the lever rod 60 to make the tool notches 312 of the corresponding radius surround the cutting tool 70A.

The present invention can move the lever rod 60 to adjust the two magnetic shielding boards 31 for shielding magnetic force, and fits with the cutting tools of different diameters. The adjusting unit has a simplified structure, is easy to assemble and thus can reduce cost of production.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable heating mantle comprising:
    a mantle body having
        a center;
        a top face;
        a rod hole formed through the center of the mantle body;
    a positioning plate mounted on the top face of the mantle body and having
        a top face;
        a wall mounted in an outer periphery of the top face of the positioning plate;
        an assembling recess formed in the top face of the positioning plate and inside the wall;
        a tool hole formed through a center of the top face of the positioning plate and communicating with the rod hole; and
        multiple positioning protrusions disposed around the tool hole on the top face of the positioning plate;
    an adjusting unit mounted in the assembling recess and having
        two magnetic shielding boards rotatably mounted on two of the multiple positioning protrusions respectively and arranged in a diagonal line, and each magnetic shielding board having
            a center;
            multiple tool notches formed around a periphery of the magnetic shielding board at intervals;
        a sliding ring slidably mounted in the assembling recess; and
        two connecting rods connected to the sliding ring, and the two connecting rods respectively connected to the two magnetic shielding boards;
    a lid covering the top face of the positioning plate, mounted on the top face of mantle body and having
        a center;

an outlet hole formed through the center of the lid and being coaxial with the tool hole; and a moving groove defined beside the outlet hole, a shape of the moving groove corresponding to a rotation route of one of the ends of one of the connecting rods; and a lever rod inserted through the moving groove and mounted on one of the magnetic shielding boards; wherein the two magnetic shielding boards are rotated synchronously by moving the lever rod.

2. The adjustable heating mantle as claimed in claim 1, wherein each magnetic shielding board has a positioning hole defined in the center of the magnetic shielding board and disposed correspondingly around one of the positioning protrusions.

3. The adjustable heating mantle as claimed in claim 2, wherein each tool notch has a radius, and the radiuses of the tool notches in each magnetic shielding board gradually decrease along a clockwise direction.

4. The adjustable heating mantle as claimed in claim 3 further comprising a rotating ring being annular, engaged with the positioning protrusions and covering the two magnetic shielding boards, wherein the rotating ring has multiple escaping notches formed in a periphery of the rotating ring.

5. The adjustable heating mantle as claimed in claim 3, wherein four positioning protrusions are implemented at equal intervals.

\* \* \* \* \*